United States Patent [19]

Fabrizi

[11] Patent Number: 5,739,467
[45] Date of Patent: Apr. 14, 1998

[54] MODULAR ELECTRIC APPARATUS WITH INHERENTLY FINGERPROOF PROTECTION FOR CLAMP TERMINALS

[75] Inventor: Fabrizio Fabrizi, Bergamo, Italy

[73] Assignee: Bticino S.p.A., Milano, Italy

[21] Appl. No.: 581,615

[22] PCT Filed: Jul. 13, 1994

[86] PCT No.: PCT/EP94/02304

§ 371 Date: Apr. 1, 1996

§ 102(e) Date: Apr. 1, 1996

[87] PCT Pub. No.: WO95/03641

PCT Pub. Date: Feb. 2, 1995

[30] Foreign Application Priority Data

Jul. 20, 1993 [IT] Italy .................. MI93A1596

[51] Int. Cl.⁶ .................................................. H02G 3/18
[52] U.S. Cl. .................................. 174/60; 220/4.02
[58] Field of Search ......................... 174/17 R, 48, 174/50, 57, 60, 64, 59; 220/3.5, 3.7, 4.02, 4.03

[56] References Cited

U.S. PATENT DOCUMENTS

| | | | |
|---|---|---|---|
| 3,803,342 | 4/1974 | Stearley et al. | 174/59 |
| 4,605,816 | 8/1986 | Jorgensen et al. | 174/65 R |
| 4,700,437 | 10/1987 | Hoshino | 24/456 |
| 4,929,198 | 5/1990 | Strate et al. | 439/709 |
| 5,495,659 | 3/1996 | Beakes et al. | 29/736 |

FOREIGN PATENT DOCUMENTS

| | | |
|---|---|---|
| 303150 | 6/1970 | Germany. |
| 2 309 019 | 9/1973 | Germany. |
| 3326049 A1 | 1/1985 | Germany. |
| 3428258 A1 | 2/1986 | Germany. |
| 250 213 A1 | 9/1987 | Germany. |

*Primary Examiner*—Kristine L. Kincaid
*Assistant Examiner*—Dhiru R. Patel
*Attorney, Agent, or Firm*—Sheridan Ross P.C.

[57] ABSTRACT

A modular electric apparatus is provided with inherent fingerproof protection for clamp terminals, including at least one clamp terminal housed within an insulating body and provided with a fixed jaw and a moveable jaw, the body being provided with an opening for introducing an electric termination between the jaws, and further including an insulative diaphragm interconnected to the moveable jaw to gradually shut off the opening.

6 Claims, 1 Drawing Sheet

MODULAR ELECTRIC APPARATUS WITH INHERENTLY FINGERPROOF PROTECTION FOR CLAMP TERMINALS

The present invention relates to a modular electric apparatus, in particular of the type for rail installation, provided with inherently fingerproof protection for clamp terminals.

It is known that modular electric apparatus designed for assembly into electric systems are provided with clamp terminals for electrical connection to cables which may have large cross-sectional areas.

The clamps include a jaw or fixed element made of a conductive material and an opposite movable jaw which is moved toward the fixed element by means of a screw to clamp the ends of a conductor in the gap therebetween, thereby securing the conductor mechanically in electrical communication with the fixed conductive element.

The clamp terminals are housed within an insulating plastics casing of the apparatus which provides electrically live parts with a measure of protection from incidental shocks.

However, that protection cannot be made comprehensive because openings have to be left both to operate the clamping screws and for introducing the conductor ends through their respective clamp terminals.

For the clamping screws, such compact tools as Phillips or Allen drivers may be used.

In this case, the access openings for the screws may be made small enough to prevent a finger from getting in, whether by accident or deliberately, of an operator who may be the installer himself or a user given access to the system.

For this purpose, a maximum size has been set for the opening which will comply with this safety requisite, and a standard tool, called the "reference finger" provided for compliance checking.

This requisite cannot generally be met in the instance of openings designed for passing cable ends through to the clamp terminals because these openings are to allow for comfortable introduction of cable ends of large cross-sectional area as well.

Thus, clamp terminals are fingerproofed by means of devices of a secondary type and less than fully satisfactory, such as removable caps of an insulative material applied to the clamp openings or removable protection screens spanning the whole electric panelboard rather than a specific opening.

The risk of incidental contact with the live parts, albeit minor, has not been removed entirely and poses a significant safety problem to the operator.

This problem compounded by that of the proper fitting of the cable ends in the clamp terminals.

The through openings for the cable ends do not allow, under normal installation conditions, for the open or closed state of the clamps to be observed.

Thus, cable ends may be passed through the openings, and rather then enter the jaws for clamping, get misled through the clearance space provided in the apparatus for the jaws, with the result that actual and effective electrical connection of the cable ends to the clamps cannot be ensured.

These problems are solved according to the invention by a modular electric apparatus having an inherently fingerproof protective arrangement for the clamp terminals and comprising a diaphragm of an insulative material slidable within a grooved seat at the clamp opening and driven by the movable jaw as a shutter with variable closure setting according to the position of the movable jaw to only give access, through the opening, to the space between the jaws and to screen off live parts facing toward the opening.

The features and advantages of the invention will be apparent from the following description of a preferred embodiment of the invention and the accopanying drawings, in which:

FIG. 1 is a perspective view showing schematically a prior art modular electric apparatus for rail installation.

Figure 2:
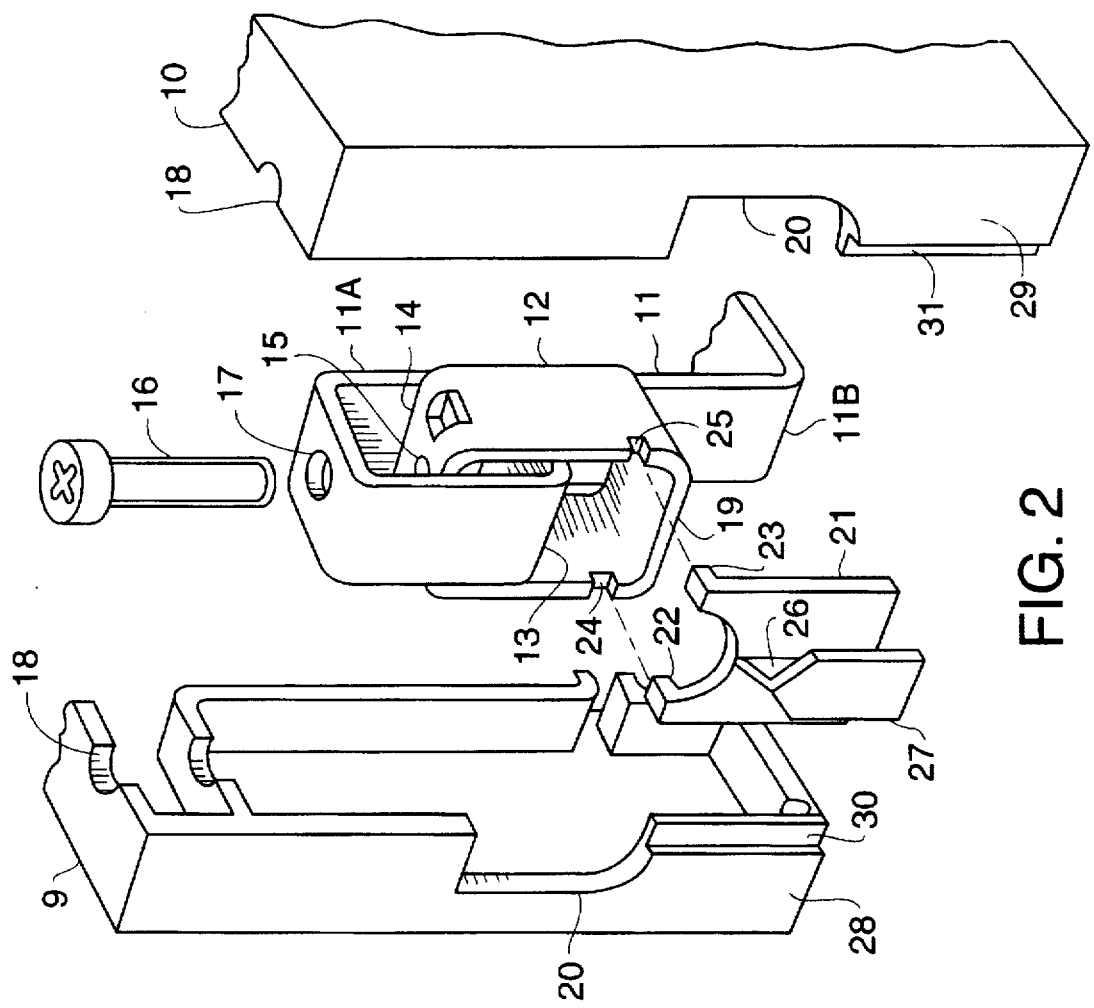
FIG. 2 is an exploded perspective view of a detail of the apparatus with inherent protection according to the invention.
Figure 1:
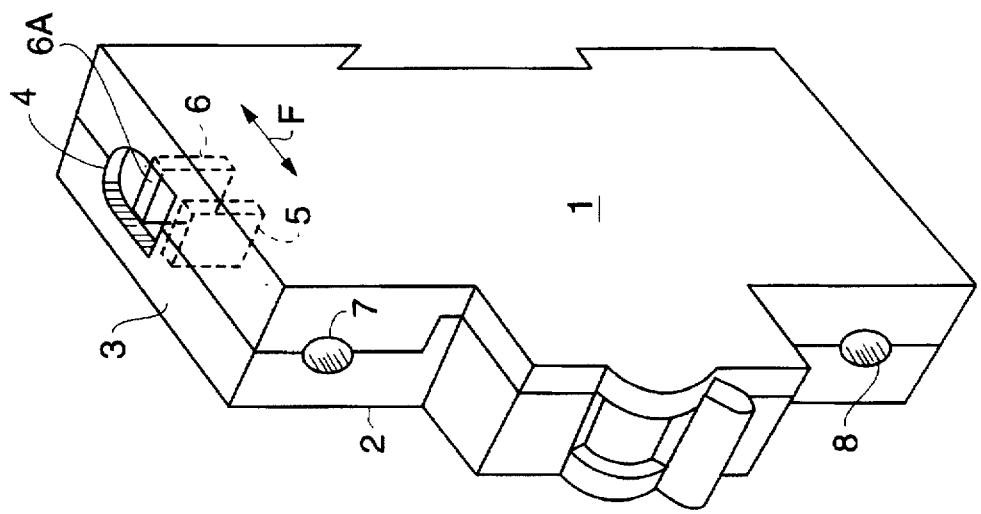
FIG. 1 is a perspective view of a modular electric apparatus.

The apparatus 1 has a shape in the general form of a flattened parallelepipedon and is provided with a front wall 2 generally carrying actuation handles and pushbuttons and a back wall formed with rail-hooking teeth.

The top wall 3 is formed with an opening 4 through which the clamp terminal can be reached, the latter being housed within the apparatus and comprised of a fixed jaw 5 and a movable jaw 6 which can be moved toward the jaw 5 by operating a screw whose head can be reached through an opening 7 in the front wall.

A similar clamp terminal is provided in the lower portion of the apparatus and can be reached through an opening, not shown, in the bottom wall which is the equivalent of the opening 4 and actuatable by means of a screw to be reached through a second front opening 8.

The opening 4 and its corresponding one in the bottom wall are intended for receiving the ends of an electric cable 30 which may be of significant bulk.

Therefore, the free cross-section of the openings is comparatively large and involves the risk of the operator coming incidentally in contact with the internal live parts, in particular the movable jaw 6 which has an exposed edge 6A adapted to be shifted in the directions of double-headed arrow F through the opening 4 breadth.

The contact risk is the more apparent the closer is the edge 6A moved to a central position in the window.

Also, an operator standing in front of the apparatus clearly has a limited or no view of the clamp terminal state and of the position of the movable jaw relative to the opening.

The introduction of a cable end through the opening 4 for clamping in the terminal is, accordingly, an awkward operation which may easily be performed improperly.

It may indeed happen that the end gets through the opening 4 externally of the jaws, rather than between the two jaws, if the latter have not been fully opened for a reason whatever upon the introduction.

It may also happen, in the instance of multiple ends, that only some fit correctly through the jaws, thus creating a risk of high-resistance false contacts and insufficient mechanical grip.

The same problems would also be encountered, of course, when clamping cable ends in the lower clamp not shown is attempted.

FIG. 2 is an exploded perspective view in cross-section of a portion of the apparatus embodying the invention and being provided with inherent protection.

The box-type housing of the apparatus is preferably formed of two half-shells 9, 10 made of an insulative material which mate along a perpendicular plane to the direction of least bulk lying parallel with the plane of the side walls, and houses a clamp terminal consisting of a fixed element 11 and a movable element 12.

The fixed element is formed of a strip of a conductive material, preferably copper or high conductivity alloys thereof, bent into a quadrangular loop 11A having a perpendicular axis to the mating plane of the half-shells, provided with a lug 11B for connection to electric devices, usually switches within the apparatus.

One side 13 of the loop forms a fixed jaw of the clamp terminal.

The half-shells 9, 10 of the apparatus are formed with internal ribs for locating the fixed element in a sealed fashion.

The movable element 12 is also formed from a conductive strip and bent into a quadrangular loop linked with the loop of the fixed element.

The side 14 of the movable element located within the loop of the fixed element is provided with a threaded socket 15 for a clamping screw 16 which is passed loosely through an opening 17 in the loop 11A and threaded into the opening 15 to bias, by abutting with its end against the fixed jaw 13, the movable element toward the screw head operated through the opening 18 formed in the half-shells.

In this way, the side 19 of the movable element remote from the side 14 is moved toward the fixed jaw and functions as a movable jaw to clamp the cable end against the jaw 13.

The clamp can be reached through the opening 20 formed in the half-shells.

In accordance with the invention, the clamp is provided with a diaphragm 21 consisting of a flat plate of an insulative material provided with two hook-on teeth 22, 23 which fit into corresponding notches 24, 25 formed at the edge of the loop 12 facing the opening 20 near the movable jaw 19.

The diaphragm 21, once hooked onto the movable loop 12, will follow its movements caused by operation of the screw 16.

For this purpose, the diaphragm 21 is guided slidably slide-like in suitable grooved seats formed in the half-shells 9, 10 and by closing the jaws and shifting the jaw 19 upwards (as viewed in FIG. 2), is gradually moved upwards to shut off the opening 20.

Preferably, to provide increased strength and undeformability of the diaphragm 21, which must be made relatively thin for space considerations, the diaphragm is provided with a rib 26 at its midsection which extends in the sliding direction and is connected to a second plate 27 parallel with the diaphragm 21, to provide a rigid structural element with a H-shaped cross-section engaged with the peripheral walls 28, 29 of the half-shells and being guided thereby.

For the purpose, the walls 28, 29 are provided with relieved areas 30, 31 as appropriate to accommodate the plate 27 flush with the wall.

The diaphragm 21, by screening off the edge of the jaw 19 exposed through the opening 20, with the possible exception of a tiny portion of it, prevents incidental contact of the operator with the edge and provides a form of protection which complies with the "reference finger".

Improper introduction of the cable ends through the opening 20 and externally of the clamp jaws would also be prevented.

In addition, the operator is given external indication of the position of the movable jaw, which would be discernible even under a very small view angle on the wall which contains the opening 20.

Discernibility may be enhanced by contrasting hues and/or colors of the materials of the diaphragm 21 and the plate 27 with respect to the casing material, or by providing the plate 27 with a different surface finish or knurl finish from that of the outer surface of the apparatus body.

The above description only covers a preferred embodiment of this modular electric apparatus with inherently fingerproof protection, and it should be understood that many changes may be made thereunto without departing from the spirit of the invention.

For instance, the diaphragm may be provided with an eyelet having a raised-rim into which the loop 12 would be fitted partway, with the edge thereof fully screened off by the insulating eyelet.

I claim:

1. A modular electric apparatus with inherent fingerproof protection for clamp terminals and comprising at least one clamp terminal housed within an insulating body and provided with a fixed jaw and a moveable jaw, said insulating body having at least one opening therein for introduction of an electric termination between said fixed jaw and said moveable jaw, comprising:

an insulative diaphragm housed within said insulating body and interconnected to said moveable jaw, said diaphragm extending in an opposite direction from said fixed jaw with respect to said moveable jaw to at least partially screen off a portion of said moveable jaw facing said opening, and gradually closing said opening by said moveable jaw being shifted toward said fixed jaw.

2. An apparatus as in claim 1, wherein:

said diaphragm has raised teeth for interconnection to corresponding sockets in said moveable jaw.

3. An apparatus as in claim 2, wherein said insulating body comprises two opposing half-shells with peripheral walls in which said opening is formed, said diaphragm including a perpendicular rib received between said opposing peripheral walls and an external plate parallel with said diaphragm and forming with said diaphragm and said rib a rigid element with an H-like cross-sectional shape engaged between said opposing peripheral walls and slidable therebetween.

4. An apparatus as in claim 3, wherein said peripheral walls are relieved to accommodate said external plate.

5. A modular electric apparatus with inherent fingerproof protection for clamp terminals, comprising:

at least one clamp terminal housed within an insulating body and provided with a fixed jaw and a moveable jaw, said insulating body comprising two opposing half shells with peripheral walls and at least one opening therein for introduction of an electric termination between said fixed jaw and said moveable jaw; and an insulative diaphragm housed within said insulating body and interconnected to said moveable jaw, said diaphragm extending in an opposite direction from said fixed jaw with respect to said moveable jaw to at least partially screen off a portion of said moveable jaw facing said opening, and gradually closing said opening by said moveable jaw being shifted toward said fixed jaw, said diaphragm including a perpendicular rib received between said opposing peripheral walls and an external plate parallel with said diaphragm and forming with said diaphragm and said rib a rigid element with an H-like cross-sectional shape engaged between said opposing peripheral walls and slidable therebetween.

6. The apparatus of claim 5, wherein said peripheral walls are relieved to accommodate said external plate.

* * * * *